(12) United States Patent
Grajeda

(10) Patent No.: US 10,690,217 B2
(45) Date of Patent: Jun. 23, 2020

(54) MAGNETICALLY DYNAMIC DAMPING ASSEMBLY

(71) Applicant: BeijingWest Industries Co., Ltd., Beijing (CN)

(72) Inventor: Yinko I. Grajeda, Bellbrook, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 16/046,801

(22) Filed: Jul. 26, 2018

(65) Prior Publication Data

US 2019/0078642 A1 Mar. 14, 2019

Related U.S. Application Data

(60) Provisional application No. 62/556,924, filed on Sep. 11, 2017.

(51) Int. Cl.
*F16F 13/26* (2006.01)
*F16F 13/30* (2006.01)
(Continued)

(52) U.S. Cl.
CPC .......... *F16F 13/266* (2013.01); *B60K 5/1283* (2013.01); *F16F 13/10* (2013.01);
(Continued)

(58) Field of Classification Search
CPC .......... F16F 13/10; F16F 13/26; F16F 13/226; F16F 13/30; F16F 13/305; F16F 2224/045
(Continued)

(56) References Cited

U.S. PATENT DOCUMENTS 4,624,435 A * 11/1986 Freudenberg ........... F16F 15/03
180/300
5,042,786 A * 8/1991 Freudenberg ......... F16F 13/264
267/140.14
(Continued)

FOREIGN PATENT DOCUMENTS

CN 101936360 A 1/2011
CN 103322105 9/2013
(Continued)

OTHER PUBLICATIONS

First Office Action and search report dated Feb. 25, 2019 for counterpart Chinese patent application No. 201710696168.4, along with translation.
(Continued)

*Primary Examiner* — Thomas W Irvin
(74) *Attorney, Agent, or Firm* — William H. Honaker; Dickinson Wright PLLC

(57) ABSTRACT

An assembly for magnetically dynamic damping useful for isolating vibrational forces includes a housing wall bounding a main chamber therein. The assembly further includes a fixed magnetic source disposed in the main chamber. A diaphragm of elastic material is disposed in the assembly impermeably dividing the main chamber into sub-chambers. The diaphragm includes a magnetically actuated element adjacent to the fixed magnetic source. A source of electrical current energizes the magnetically actuated element, the fixed magnetic source, or both and either repels or pulls the magnetically actuated element with respect to the fixed magnetic source. A magnetic guide surrounds the fixed magnetic source and defines a gap exposing the fixed magnetic source to the magnetically actuated element. The magnetic guide routes the magnetic field towards the gap
(Continued)

and prevents outward magnetic interference to the rest of the assembly.

18 Claims, 15 Drawing Sheets

(51) Int. Cl.
    *F16F 13/10*     (2006.01)
    *B60K 5/12*     (2006.01)

(52) U.S. Cl.
    CPC .......... *F16F 13/105* (2013.01); *F16F 13/264* (2013.01); *F16F 13/305* (2013.01); *F16F 2222/06* (2013.01); *F16F 2224/045* (2013.01)

(58) Field of Classification Search
    USPC ........................................ 267/140.14, 140.15
    See application file for complete search history.

(56) References Cited

U.S. PATENT DOCUMENTS

| | | | |
|---|---|---|---|
| 5,249,782 A | 10/1993 | Ide et al. | |
| 5,779,231 A * | 7/1998 | Okazaki | F16F 13/26 267/140.14 |
| 6,032,937 A * | 3/2000 | Kojima | F16F 13/105 267/140.13 |
| 6,254,069 B1 | 7/2001 | Muramatsu et al. | |
| 6,276,673 B1 * | 8/2001 | Hibi | F16F 13/264 267/140.14 |
| 6,406,010 B1 | 6/2002 | Yano et al. | |
| 7,025,342 B2 * | 4/2006 | Nemoto | B60K 5/1208 267/140.14 |
| 8,172,209 B2 * | 5/2012 | Muraoka | F16F 13/26 267/140.14 |
| 8,594,911 B2 * | 11/2013 | Okamoto | F16F 13/264 267/140.15 |
| 8,616,535 B2 * | 12/2013 | Kon | F16F 13/26 267/140.14 |
| 8,770,560 B2 * | 7/2014 | Kanaya | F16F 13/268 267/140.11 |
| 9,022,368 B2 | 5/2015 | Marienfeld et al. | |
| 9,033,319 B2 * | 5/2015 | Kim | F16F 13/08 267/140.14 |
| 9,068,625 B2 * | 6/2015 | Yamamoto | F16F 13/262 267/140.14 |
| 9,440,524 B2 | 9/2016 | Farjoud et al. | |
| 2008/0296819 A1 | 12/2008 | Fursdon | |
| 2010/0301530 A1 * | 12/2010 | Koyama | F16F 13/268 267/140.14 |
| 2012/0013057 A1 * | 1/2012 | Nemoto | F16F 13/268 267/140.14 |
| 2013/0001843 A1 * | 1/2013 | Kanaya | F16F 13/26 267/140.14 |
| 2019/0077243 A1 * | 3/2019 | Grajeda | F16F 13/264 |

FOREIGN PATENT DOCUMENTS

| | | |
|---|---|---|
| CN | 103765034 | 4/2014 |
| CN | 104246282 | 12/2014 |
| CN | 106385158 A | 2/2017 |
| JP | 05164180 A | 6/1993 |
| JP | 0791483 | 4/1995 |
| JP | 0791484 A | 4/1995 |
| JP | 07158690 A | 6/1995 |
| JP | 10238584 A | 9/1998 |
| JP | 11223237 | 8/1999 |
| JP | 3304554 B2 | 7/2002 |
| JP | 3564597 B2 | 9/2004 |
| JP | 2010255788 A | 11/2010 |
| JP | 2014521029 A | 8/2014 |

OTHER PUBLICATIONS

Extended European Search Report dated Feb. 18, 2019 for counterpart European patent applicaton No. EP18193392.0.
First Office Action issued for corresponding Japanese Patent Application 2018-168604 dated Jul. 30, 2019.
First Office Action and search report dated Nov. 27, 2019 for counterpart Chinese patent application No. 201810908668.4, along with machine EN translation downloaded from EPO.

* cited by examiner

MAGNETICALLY DYNAMIC DAMPING ASSEMBLY

CROSS REFERENCE TO RELATED APPLICATION

This U.S. Utility Patent Application claims the benefit of and priority to U.S. Provisional Patent Application Ser. No. 62/556,924 filed Sep. 11, 2017, the disclosure of which is incorporated herein by reference in its entirety.

BACKGROUND OF THE INVENTION

1. Field of the Invention

The present invention is generally related to dampers. More particularly, the present invention relates to an assembly for magnetically dynamic damping useful for isolating vibrational forces.

2. Description of the Prior Art

Conventional damping assemblies are used for isolating vibrational forces and are particularly useful in automobiles which are often subject to an array of vibrational loads. Damping assemblies are often times utilized between an engine and a chassis of an automobile for insulating both environmental vibrations such as driving over a bumpy road and internal vibrations such as the idling of the engine. These assemblies include chambers that provide rebound when under increased pressure. Many damping assemblies incorporate partitions that include a decoupler having an elastic diaphragm which impermeably divide a chamber into sub-chambers. When one of the sub-chambers is subjected to increased pressure, the diaphragm flexes into the other sub-chamber, passively stifling vibrational forces. In this regard, diaphragms are particularly useful for isolating the second type of vibrations, engine idling. A modern trend has been to incorporate elements to switch decouplers between active and inactive conditions for situations in which passive damping is unwanted. One example is illustrated in U.S. Pat. No. 5,246,212 to Funahashi et al., wherein a damper is utilized in an automobile and includes a vacuum source for depressurizing one side of the divided chamber pulling the diaphragm until it is held in a flexed condition such that it can no longer passively dampen vibrations. Another example illustrated in U.S. Pat. No. 9,022,368 which involves applying electricity through a ferromagnetic diaphragm that switches the diaphragm between a ridged and flexible condition. However, a common shortcoming of these prior damping units is the inability to tune damping force requirements of the decoupler between more than just an active and an inactive condition. Particularly in situations in which dampening is required but to a lesser or greater extent, which could be a result of varying amplitude and frequency of vibrations, the prior art has failed to provide a satisfactory dynamic decoupler.

SUMMARY OF THE INVENTION

The invention provides for a magnetically dynamic damping assembly useful for isolating vibrational forces. The assembly includes a housing wall bounding a main chamber with a fixed magnetic source disposed therein. A diaphragm of elastic material is disposed in the assembly impermeably dividing the main chamber into sub-chambers. The diaphragm includes at least one magnetically actuated element adjacent to the fixed magnetic source. A source of electrical current energizes the magnetically actuated element, the fixed magnetic source, or both and either repels or pulls the magnetically actuated element with respect to the fixed magnetic source. A magnetic guide surrounds the fixed magnetic source and defines a gap exposing the fixed magnetic source to the magnetically actuated element. The magnetic guide routes the magnetic field towards to gap and prevents outward magnetic interference to rest of the assembly.

The assembly provides increased tuning in a damping assembly while preventing magnetic interference in certain applications. In environments where variable dampening is required, which may depend on the amplitude or frequency of vibrations, the subject invention provides for variable flexibility and movement of the diaphragm. Movement of the diaphragm is dependent on the strength of the magnetic field that the diaphragm is exposed to. Furthermore, in applications where magnetic interference is unwanted, such as a magnetorheological fluid damper, the magnetic guide routes the magnetic field directly to the diaphragm and prevents exposure of the magnetically actuated fluid to the magnetic field.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Example embodiments will now be described more fully with reference to the accompanying drawings. The subject embodiments are directed to a magnetically dynamic damping assembly. However, the example embodiments are only provided so that this disclosure will be thorough, and will fully convey the scope to those who are skilled in the art. Numerous specific details are set forth as examples of elements to provide a thorough understanding of embodiments of the present disclosure. Referring to the Figures, wherein like numerals indicate corresponding parts throughout the several views, a magnetically dynamic damping assembly constructed in accordance with the subject invention is generally shown in FIGS. 1 and 2.

Figure 1:
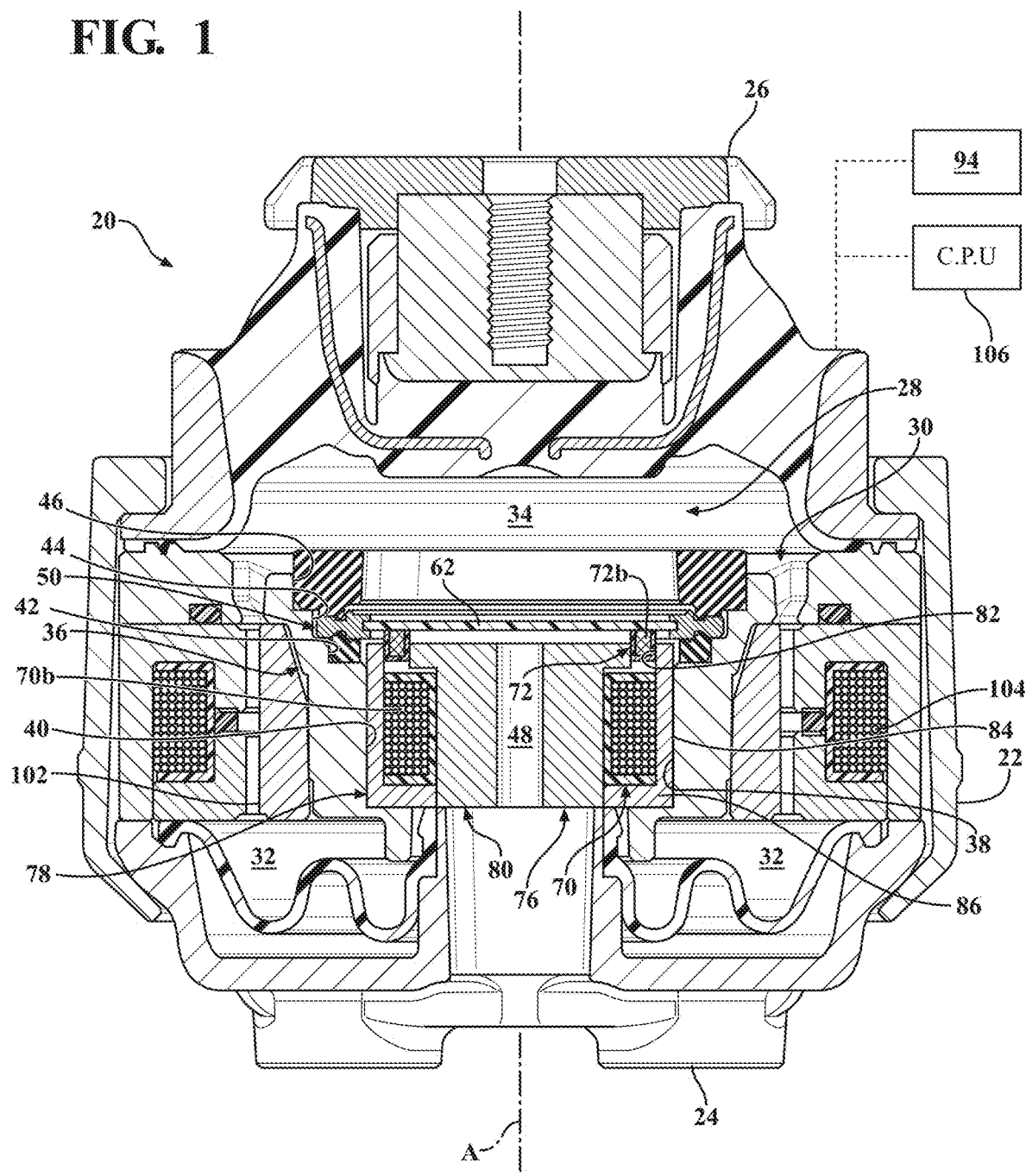
FIG. 1 is a cross-sectional view of an example embodiment of the damping unit in an non-energized condition wherein a diaphragm is free to flex.
Figure 2:
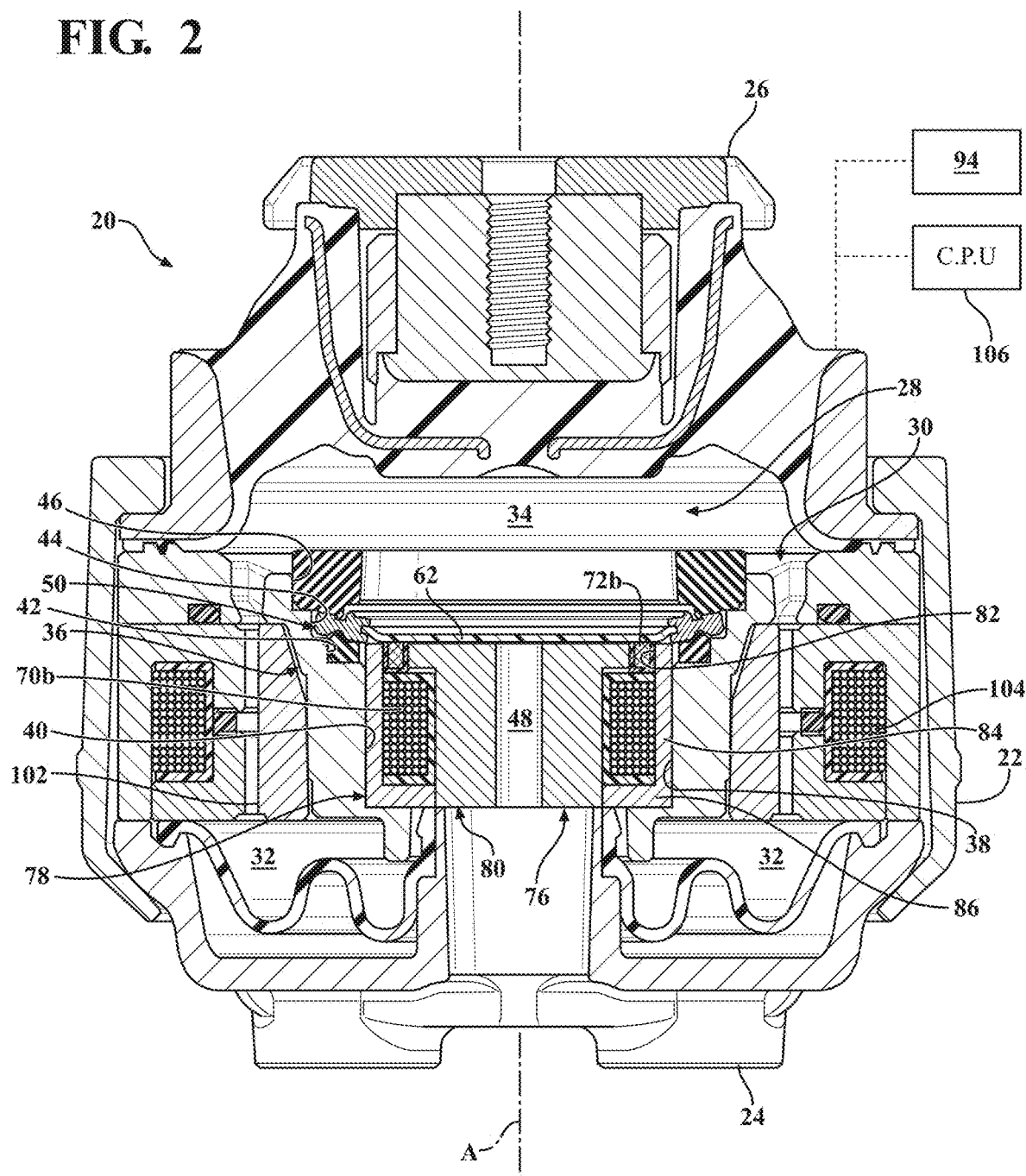
FIG. 2 is a cross-sectional view of the example embodiment of the damping unit in an energized condition wherein the diaphragm is restrained from movement by a magnetic force.

The magnetically dynamic damping assembly includes a damping unit 20, generally shown in FIGS. 1 and 2, having a housing wall 22 of cylindrical shape extending about an axis A between a base portion 24 and a top portion 26 bounding a main chamber 28 therein. A barrier 30 is spaced between the base portion 24 and the top portion 26 and divides the main chamber 28 between a base sub-chamber 32 and a top sub-chamber 34. The barrier 30 typically extends perpendicularly to the axis A centrally between the base portion 24 and the top portion 26. A partition 36 is disposed in the main chamber 28 and includes an internal holding wall 38. The internal holding wall 38 extends radially about the axis A and includes a first section 40, a second section 42, a third section 44, and a fourth section 46 divided by steps wherein each subsequent section extends radially outwardly from the preceding section at a step. The first section 40 defines an isolation chamber 48 having a generally cylindrical shape. The second section 42 extends radially outwardly from the first section 40 to defining a bottom bearing holding space. Subsequently, the third section 44 extends radially outwardly from the second section 42 to define a decoupler holding space. At the next step, the fourth section 46 extends radially outwardly from the third section 44 to define a top bearing holding space. A bottom bearing ring 52 includes a bottom bearing rib 54 and sits on the step between the first and second sections 40, 42 and is pressed into the second section 42. A decoupler 50 sits on the next step and is pressed into the third section 44 impermeably separating the isolation chamber 48 from the main chamber 28. A top bearing ring 56 includes a top bearing rib 58 and sits on the last step pressed into the fourth section 46.

The decoupler 50, generally indicated in FIGS. 1-4, has a disk shape. The decoupler 50 includes an outer ring 60 having an annular shape that delimits a flexible diaphragm 62. The outer ring 60 provides both axial and radial support of the diaphragm 62 and extends axially between a top ring side and a bottom ring side. An outermost edge of the outer ring 60 can be sized to engage the third section 44 of the internal holding wall 38 in a press-fit connection. The outer ring 60 has a cross section that defines a circular outer portion 64 extending inwardly to a neck portion 66 extending inwardly to a holding portion 68. The holding portion 68 is connected to and retains the diaphragm 62. The outer ring 60 is thicker than the diaphragm 62 such that the diaphragm 62 is disposed between and spaced from the top ring side and the bottom ring side. When assembled, the neck portion 66 is disposed adjacently between the bottom bearing rib 54 and the top bearing rib 58 for retaining the circular outer portion 64 in the third section 44 while allowing some axial flexing of the outer ring 60. Thus, when the main chamber 28 is placed under pressure, the assembly allows elastic displacement of the diaphragm 62 towards or away from the isolation chamber 48.

Figure 3A:
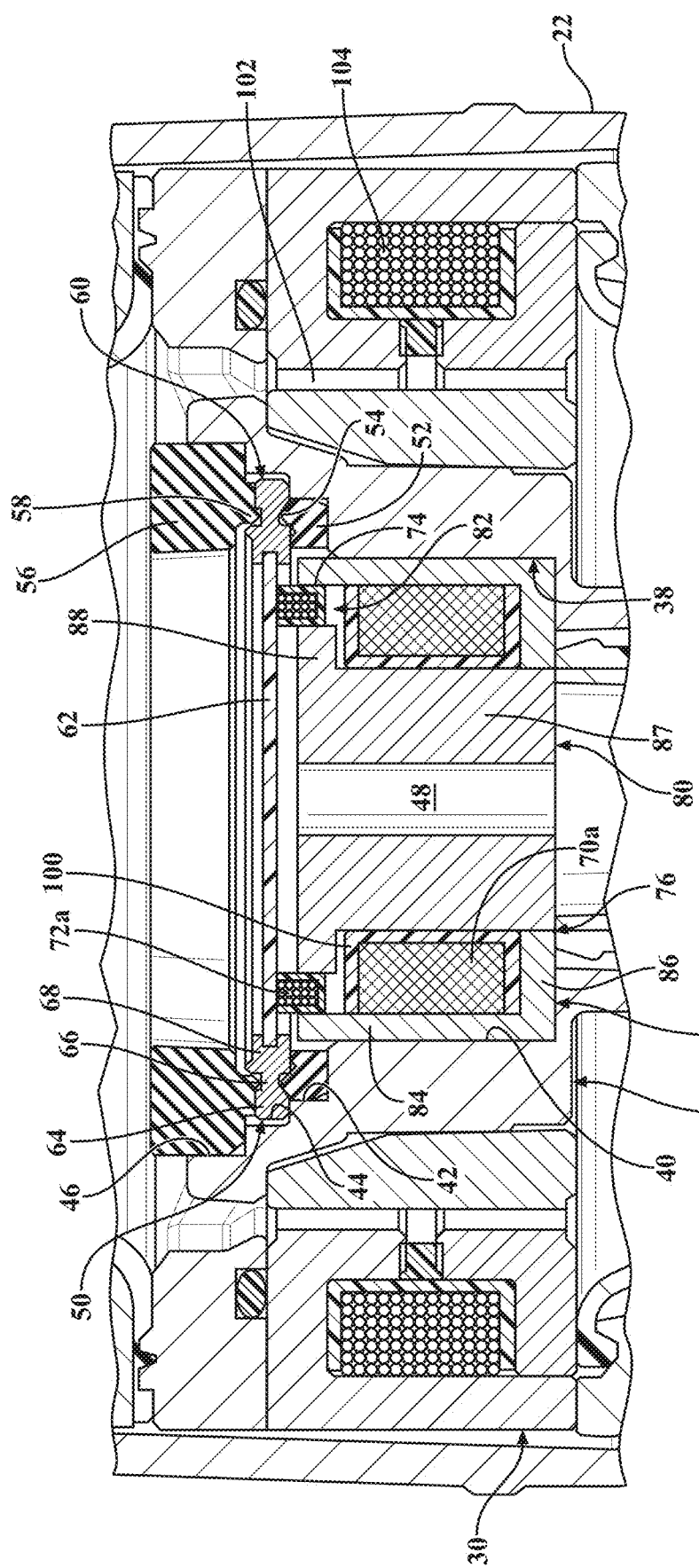
FIG. 3A is a cross-sectional view of one embodiment of the subject invention utilizing a moving coil and a fixed permanent magnet.
Figure 3B:
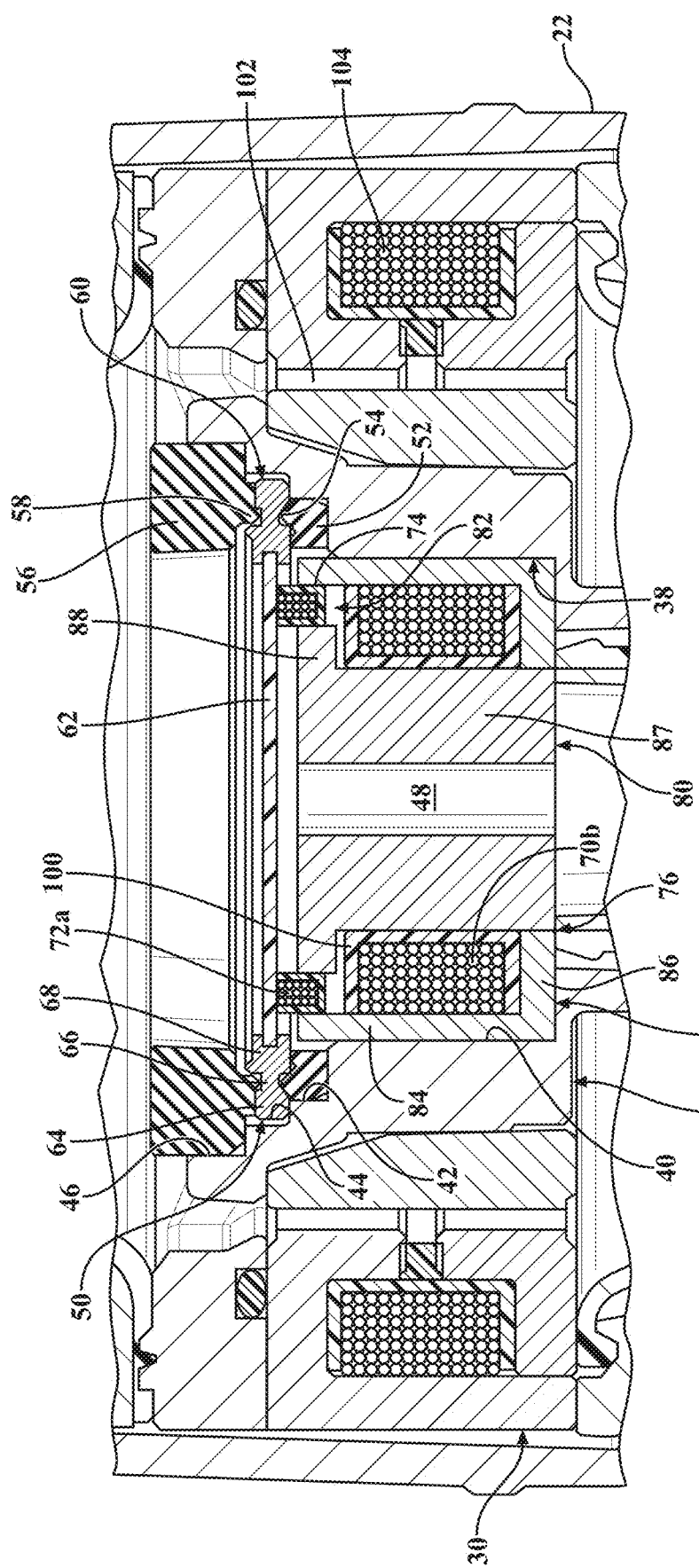
FIG. 3B is a cross-sectional view of another embodiment of the subject invention utilizing the moving coil and a fixed induction coil.
Figure 3C:
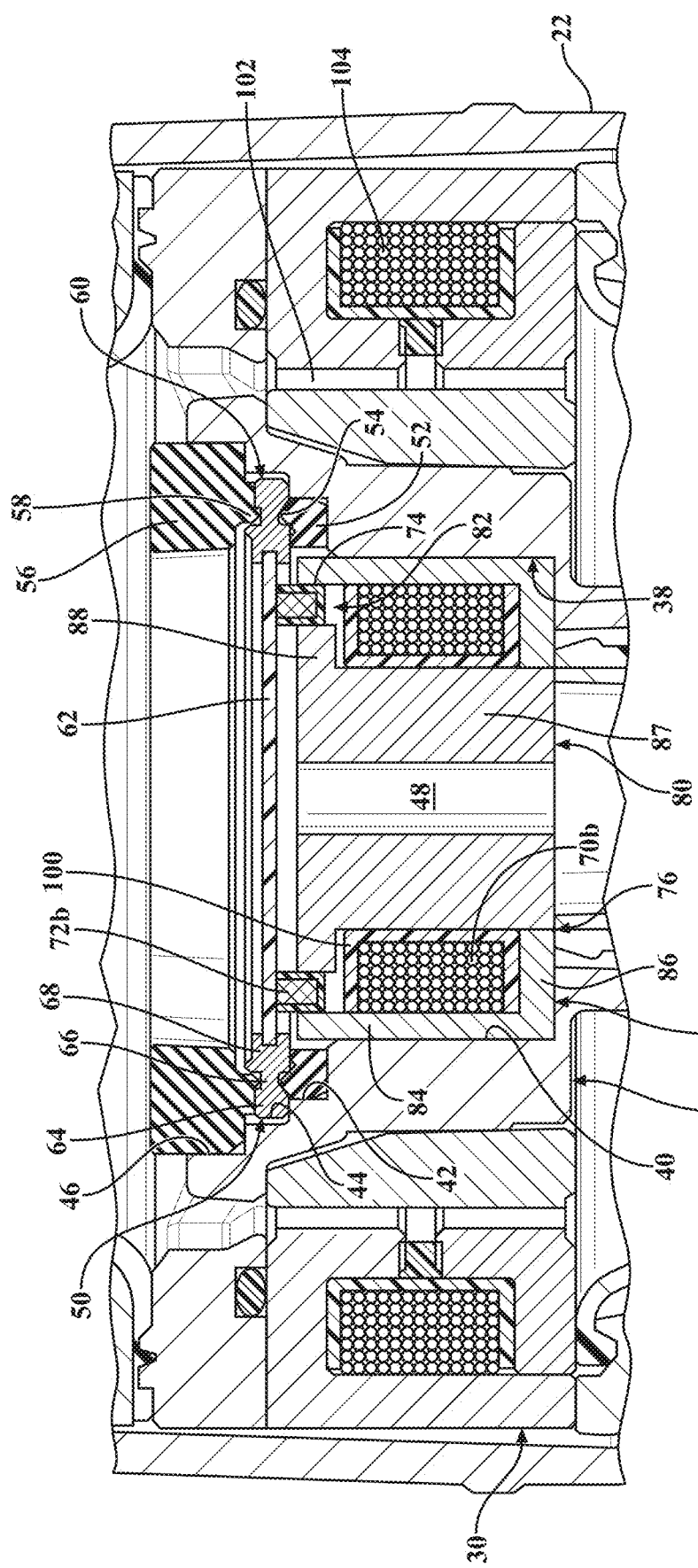
FIG. 3C is a cross-sectional view of yet another embodiment of the subject invention utilizing an annular moving magnet and the fixed induction coil.
Figure 3D:
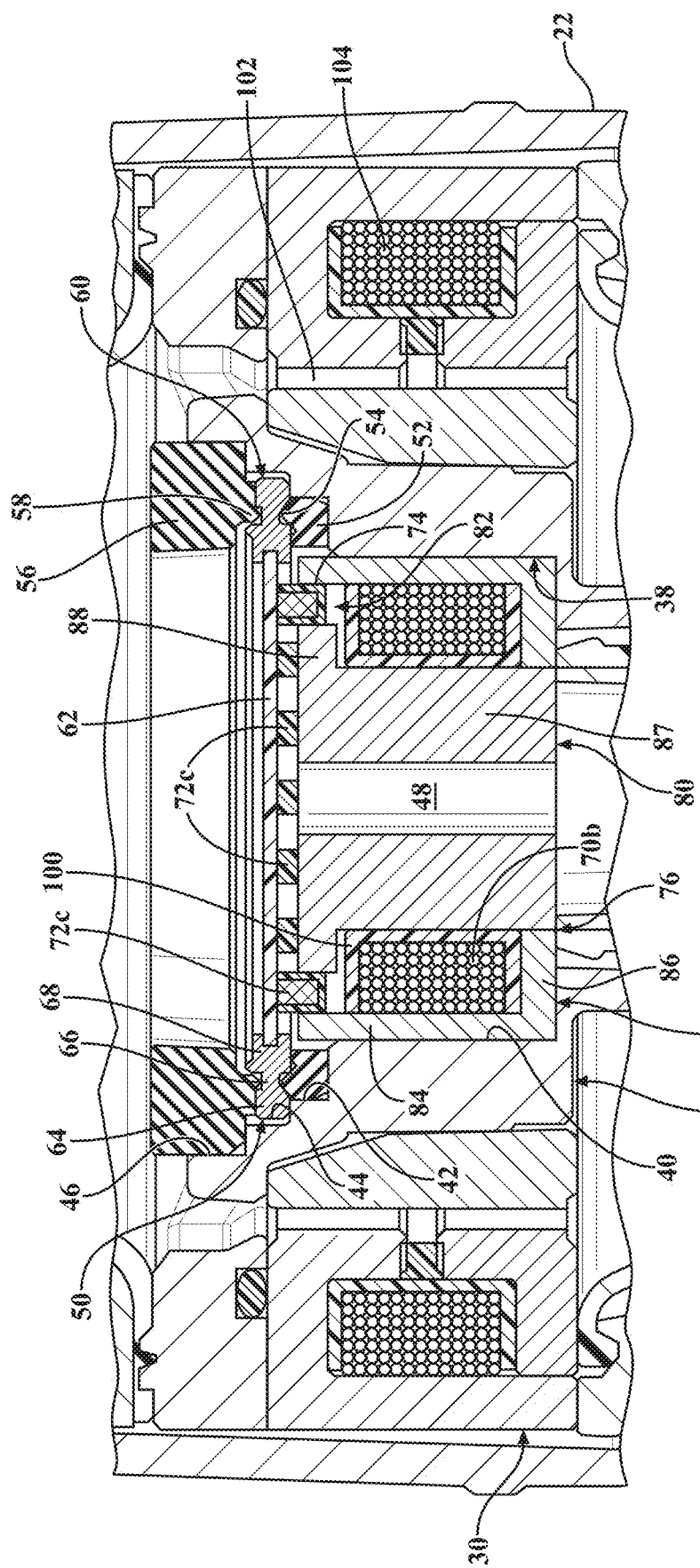
FIG. 3D is a cross-sectional view of another embodiment of the subject invention utilizing a plurality of block-shaped moving magnets and the fixed induction coil.
Figure 4:
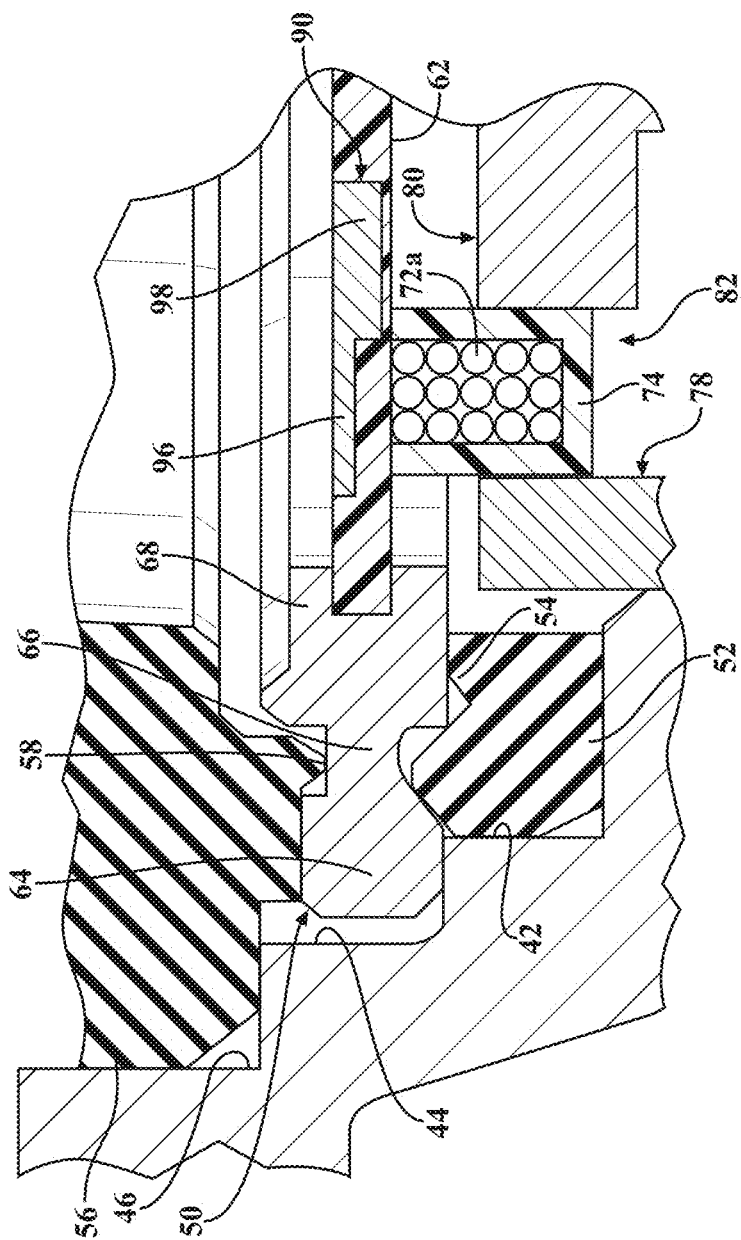
FIG. 4 is an enlarged cross-sectional view illustrating the connection of a decoupler to the damping unit.

As best illustrated in FIGS. 3A through 4, in order to provide dynamic rebound properties to the decoupler 50, the partition 36 includes a fixed magnetic source 70 that is utilized to employ a magnetic field when it is in an energized state. The fixed magnetic source 70 includes an outer side, facing the housing wall 22 of the damping unit 20 and an inner side facing the isolation chamber 48. The decoupler 50 includes a magnetically actuated element 72 embedded therein and extending axially therefrom to define a diaphragm rib 74. A magnetic guide 76 extends around the fixed magnetic source 70 for retaining the magnetic field. The magnetic guide 76 includes a sleeve 78 that is placed over the outer side of the fixed magnetic source 70 and a core 80 that is disposed on the inner side of the fixed magnetic source 70. The sleeve 78 and core 80 are disposed such that the entire fixed magnetic source 70 is surrounded except a small gap 82 between the sleeve 78 and the core 80 facing the diaphragm rib 74 of the decoupler 50. In one embodiment, the sleeve 78 includes an annular sleeve wall 84 extending to a sleeve lip 86 that extends perpendicularly, radially inward therefrom. The core 80 includes an annular core wall 87 extending to a core lip 88 extending radially outwardly therefrom. The sleeve 78 and core 80 guide the magnetic field into the gap 82, orienting it with the decoupler 50, and preventing magnetic interference outside of the partition 36. The magnetically actuated element 72 reacts to the employed magnetic field, where the axially extending diaphragm rib 74 is either pulled into the gap 82 or pushed away from the gap 82. A non-magnetic insert 90 (shown in FIG. 4) is placed under the magnetically actuated element 72 to provide radial and axial support and align the magnetically actuated element 72 during the push and pull movement. The insert 90 is non-magnetic and does not interfere with the magnetic operation of the partition 36 and may also reroute the magnetic field back towards the gap 82.

Figure 5A:
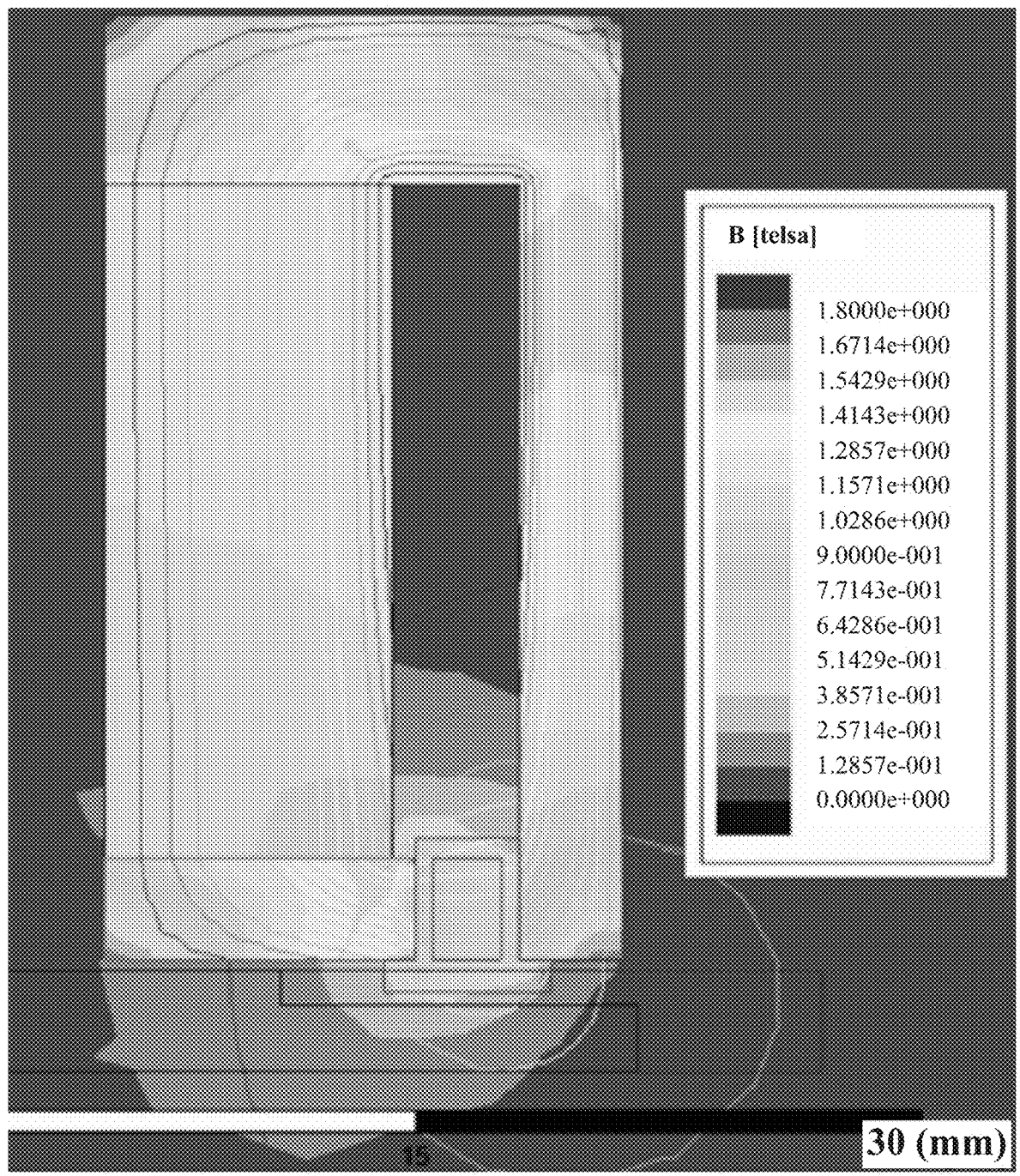
FIGS. 5A-5C are graphical representations of the embodiment illustrated in FIG. 3A wherein the fixed permanent magnet and the moving coil are utilized.
Figure 5B:
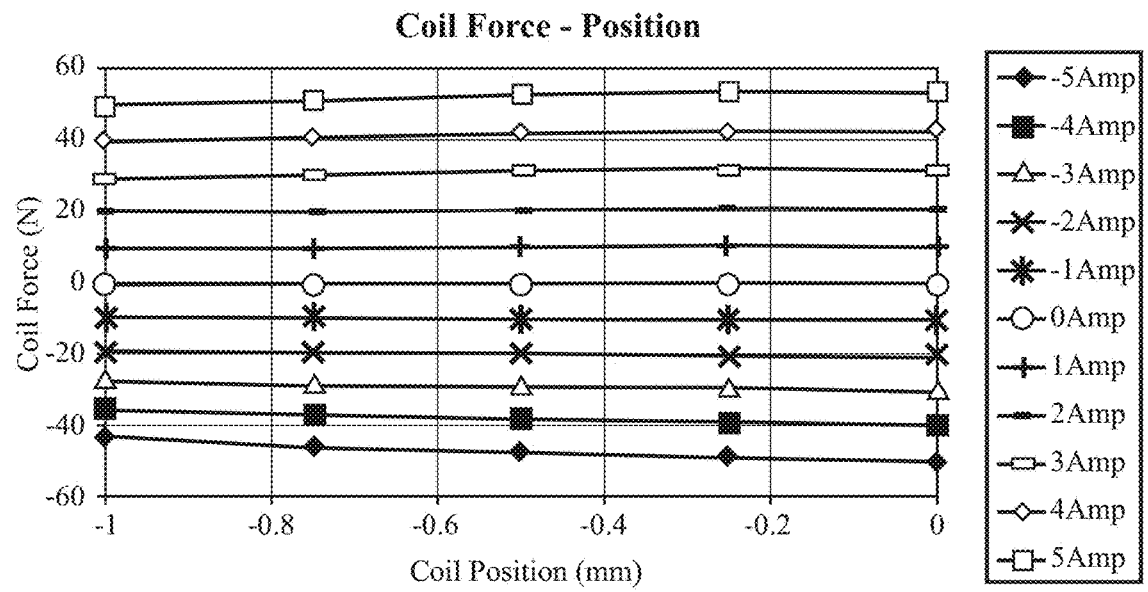
Figure 5C:
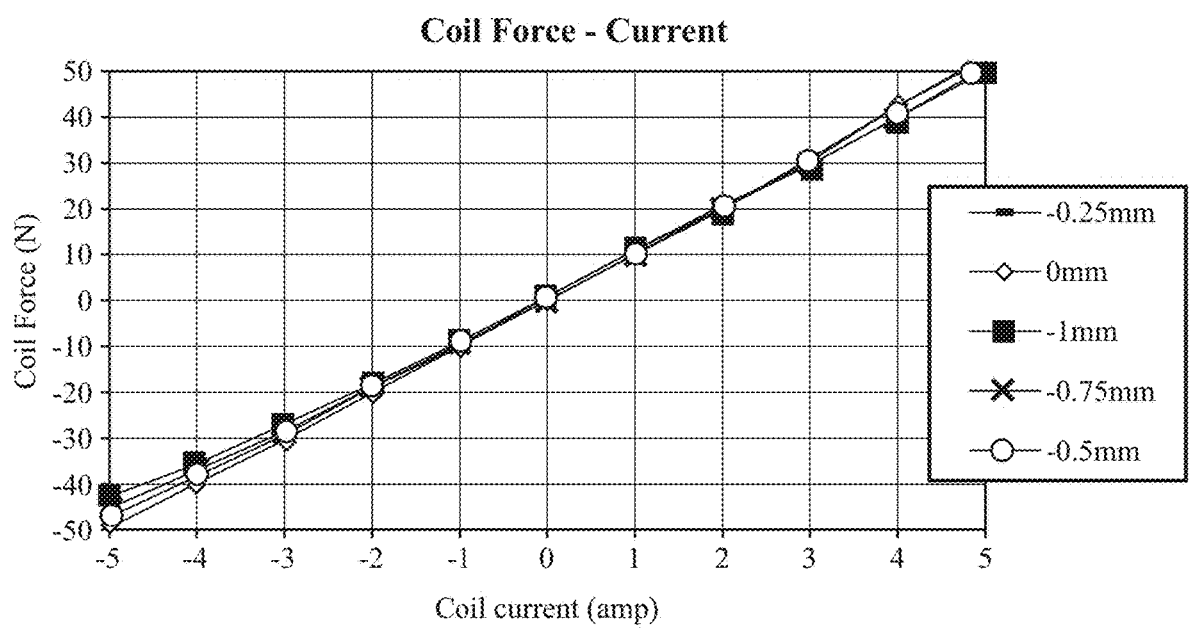

In one embodiment, illustrated in FIG. 3A, the magnetically actuated element 72 includes a moving coil 72*a* embedded in the diaphragm 62. The moving coil 72*a* extends annularly around the center of the diaphragm 62 to form a ring shape rib 74 protruding axially. The moving coil 72*a* has a deenergized state and an energized state and is connected to a source of electrical current 94 for switching between states. In a preferred embodiment, the moving coil 72*a* is over molded into the diaphragm 62 and includes approximately 200 turns. This embodiment also utilizes the non-magnetic insert 90 (shown in FIG. 4), having an annular shape that is embedded in the diaphragm 62. The non-magnetic insert 90 includes a thinner portion 96 and a wider portion 98 divided by an axial step. The non-magnetic insert 90 provides support for the moving coil 72*a* without being affected by the magnetic field. The moving coil 72*a* is disposed directly above the thinner portion 96 and adjacent to the step. The fixed magnetic source 70 includes at least one permanent magnet 70*a* placed along the first section 40 of the internal holding wall 38 between the core 80 and the sleeve 78. In a preferred embodiment, the at least one permanent magnet 70*a* includes one ring-shaped magnet; however multiple magnets could be used. The permanent magnet 70*a* creates a magnetic field that is guided by the core 80 and sleeve 78 into the gap 82. As the moving coil 72*a* is energized, a current is formed that can either draw or repel the moving coil 72*a* with respect to the the gap 82 depending on the direction of current flowing into the moving coil 72*a*. During operation, the non-magnetic insert 90 remains unaffected by the magnetic field and keeps the moving coil 72*a* in axial alignment with the gap 82, rerouting the magnetic field and preventing some magnetic interference outside of the magnetic guide 76. The graphical representation of FIG. 5A illustrates the rerouting of the magnetic field by the magnetic guide 76, and includes a legend indicating the strength of the magnetic field along areas of the magnetic guide 76 and gap 78. FIGS. 5B and 5C are graphical representations of the moving coil's 72a position, which is dependent on the strength of the induced magnetic field as a function of amount of current provided.

Figure 6A:
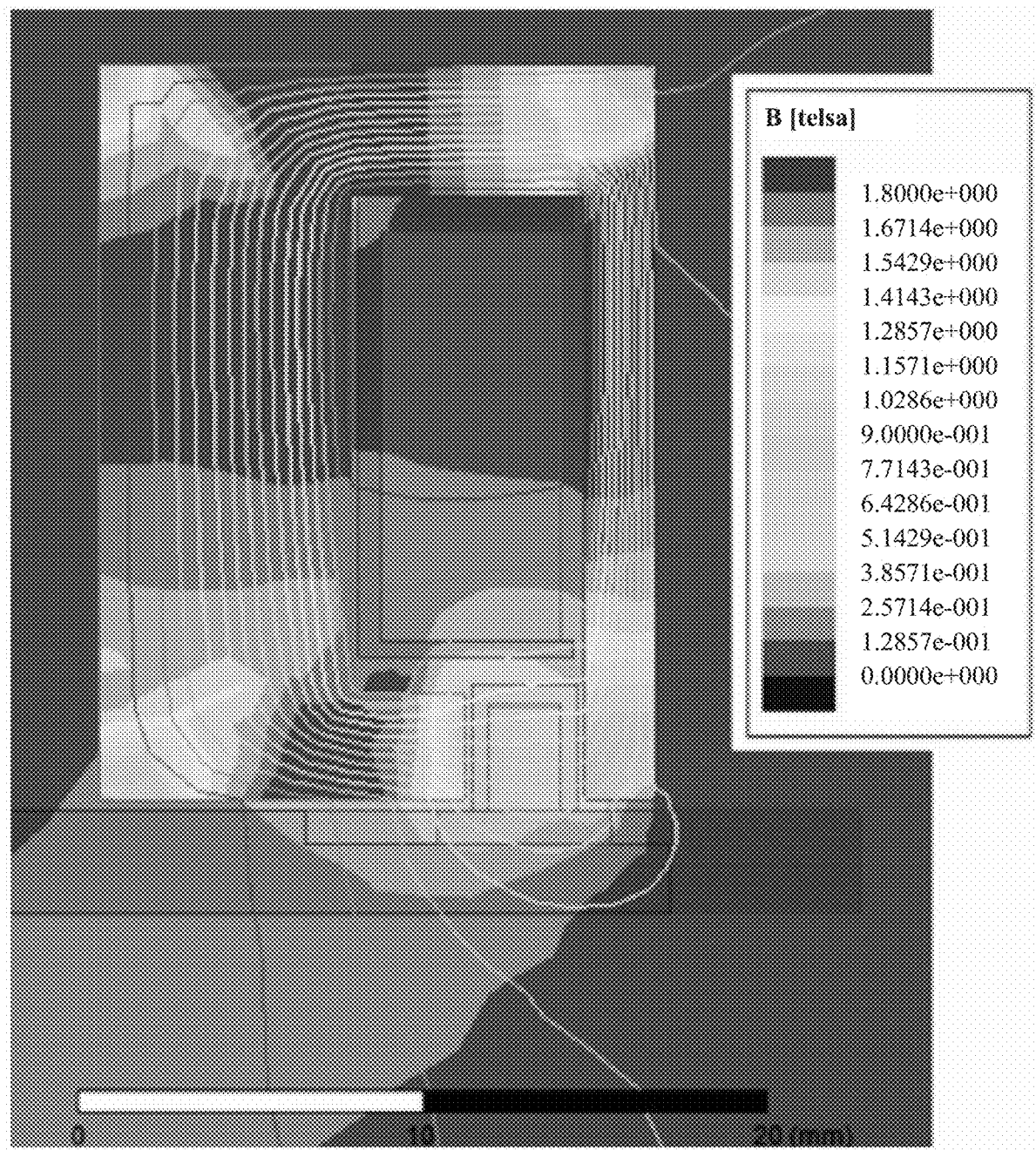
FIGS. 6A-6C are graphical representations of the embodiment illustrated in FIG. 3B wherein the fixed induction coil is utilized with the moving coil.
Figure 6B:
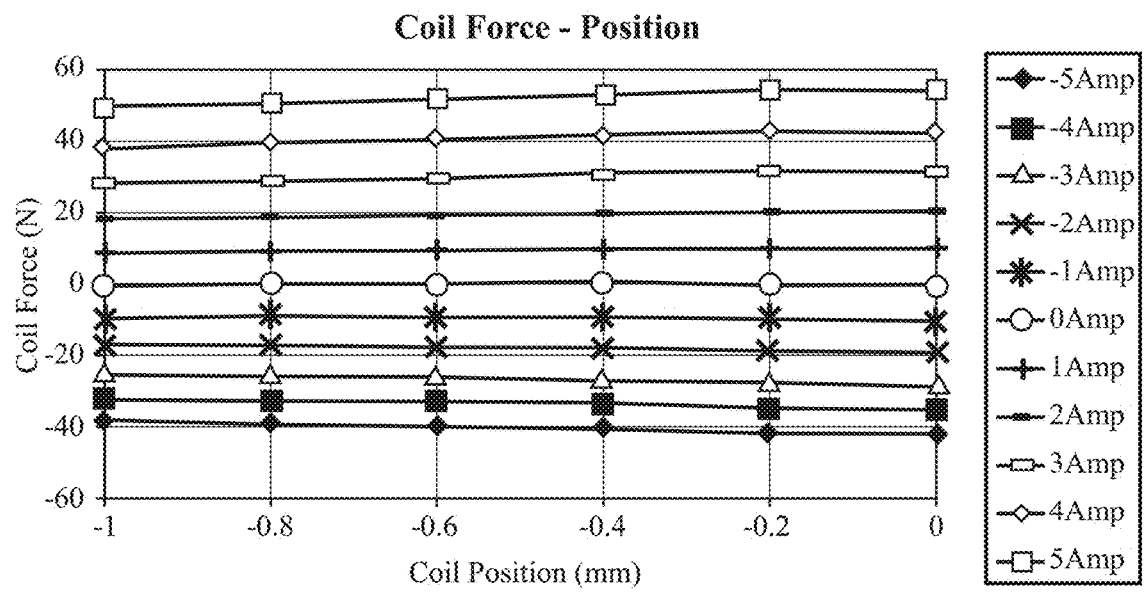
Figure 6C:
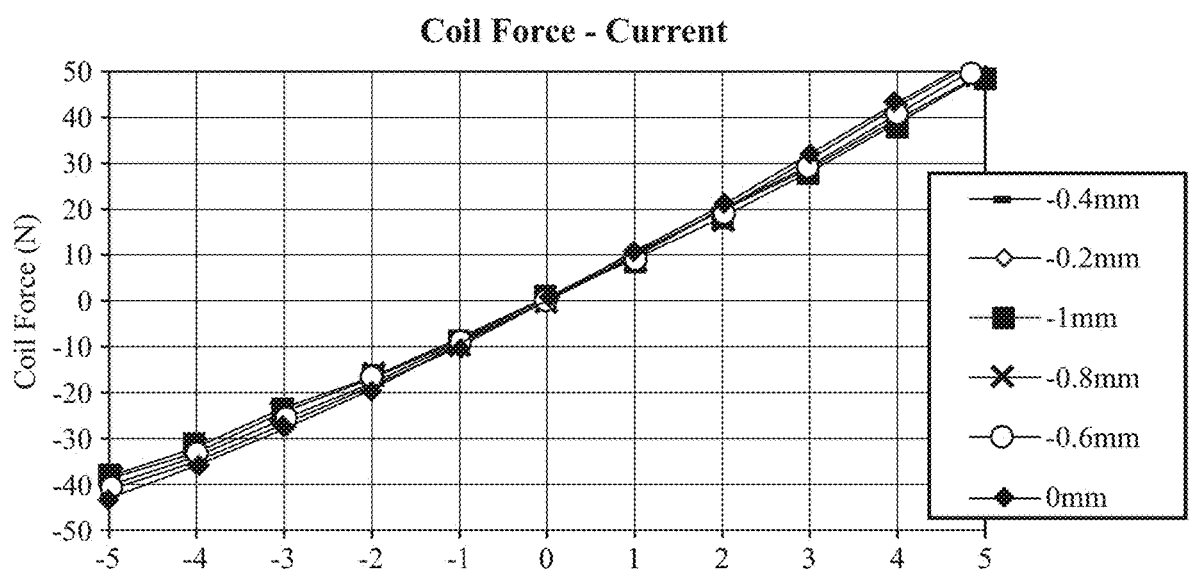

In another embodiment, illustrated in FIG. 3B, the magnetically actuated element 72 still includes a moving coil 72a embedded in the diaphragm 62 and a non-magnetic insert 90 as set forth above. However, the fixed magnetic source 70 includes a fixed induction coil 70b placed along the first section 40 of the internal holding wall 38 between the core 80 and sleeve 78. The fixed induction coil 70b is wrapped around a bobbin 100 for several turns and is electrically connected to a source of electrical current 94. In one preferred embodiment, the fixed induction coil 70b has more turns that the moving coil 72a. In one example embodiment, the fixed induction coil 70b has approximately 410 turns. Current variations in the induction coil 70b and the moving coil 72a draw and repel the moving coil 72a from the gap 82 dependent on the direction of the current through the induction coil 70b and the moving coil 72a. When a fixed induction coil 70b is used, the magnetic guide 76 may define one or more apertures for allowing a wire to extend therethough and form an electrical connection between the fixed induction coil 70b and the source of electrical current 94. A graphical representation in FIG. 6A illustrates the rerouting of the magnetic field by the magnetic guide 76, and includes a legend indicating the strength of the magnetic field along areas of the magnetic guide 76 and gap 78. FIGS. 6B and 6C are graphical representations of the moving coil's 72a position, which is dependent on the strength of the induced magnetic field as a function of amount of current provided to both the moving coil 72a and the fixed induction coil 72b.

Figure 7A:
FIGS. 7A-7C are graphical representations of the embodiment illustrated in FIG. 3C wherein the fixed induction coil is utilized with a single annularly shaped moving magnet.
Figure 7B:
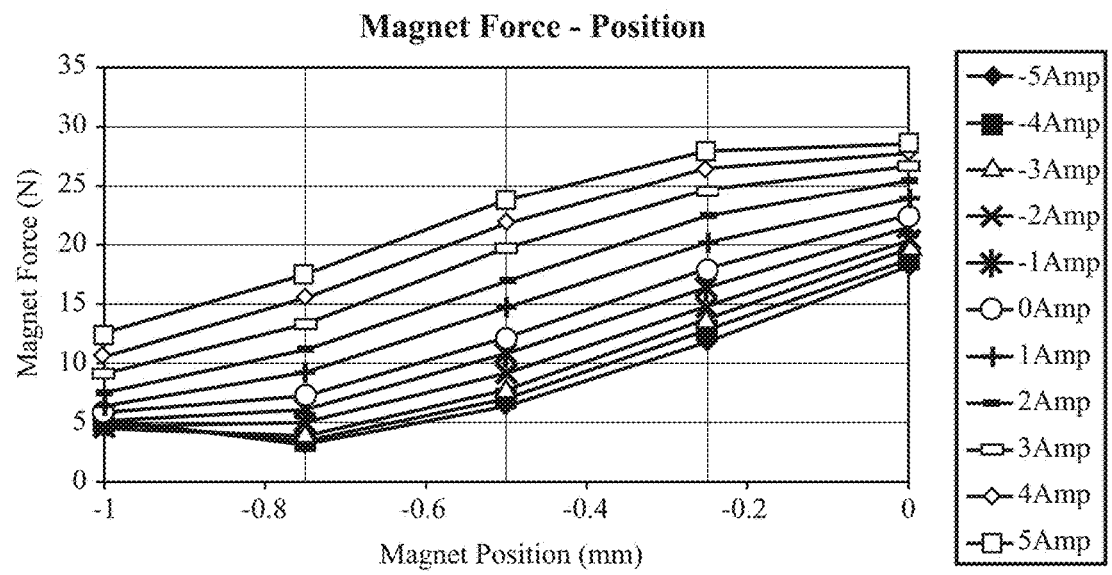
Figure 7C:
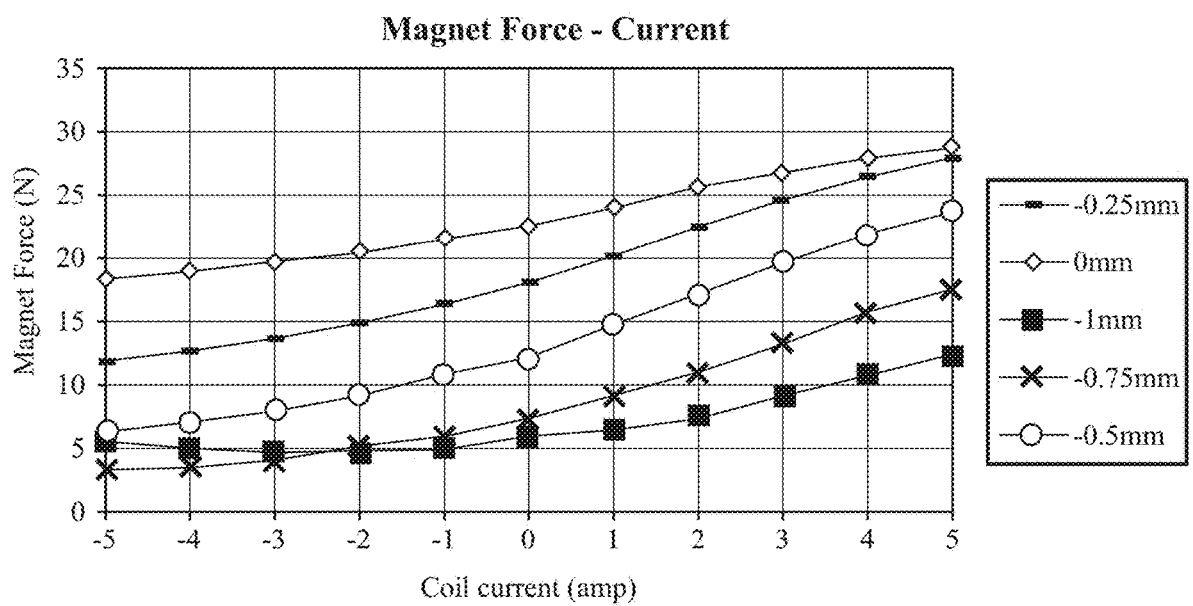

In yet another embodiment, illustrated in FIG. 3C, the magnetically actuated element 72 includes at least one moving magnet 72b. The at least one moving magnet 72b is typically includes one magnet having an annular shape corresponding to the shape of the gap 82 between the sleeve 78 and the core 80. The moving magnet 72b constantly provides a magnetic field. Because this magnetic field is always present, the fixed magnetic source 70 of this embodiment is a fixed induction coil 70b so that there are not always two interacting magnetic fields. Accordingly, as the fixed induction coil 70b is charged, the fixed induction coil 70b creates a magnetic field and pulls the movable magnet into the gap 82 or pushes it away from the gap 82. A graphical representation in FIG. 7A illustrates the rerouting of the magnetic field by the magnetic guide 76 when one annular moving magnet 72b is utilized, and includes a legend indicating the strength of the magnetic field along areas of the magnetic guide 76 and gap 78. FIGS. 7B and 7C are graphical representations of the annular moving magnet's 72b position, which is dependent on the strength of the magnetic field as a function of amount of current provided to the fixed induction coil 72b.

Figure 8A:
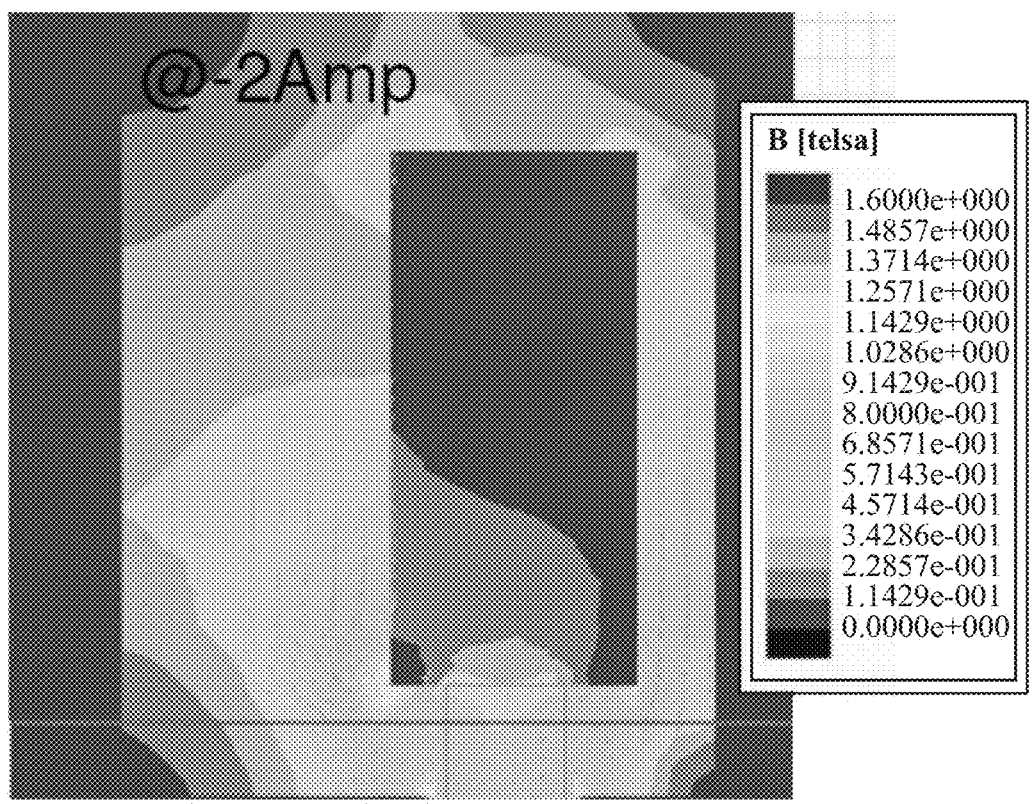
FIGS. 8A-8C are graphical representations of the embodiment illustrated in FIG. 3D wherein the fixed induction coil is utilized with a plurality of block shaped moving magnets.
Figure 8A:
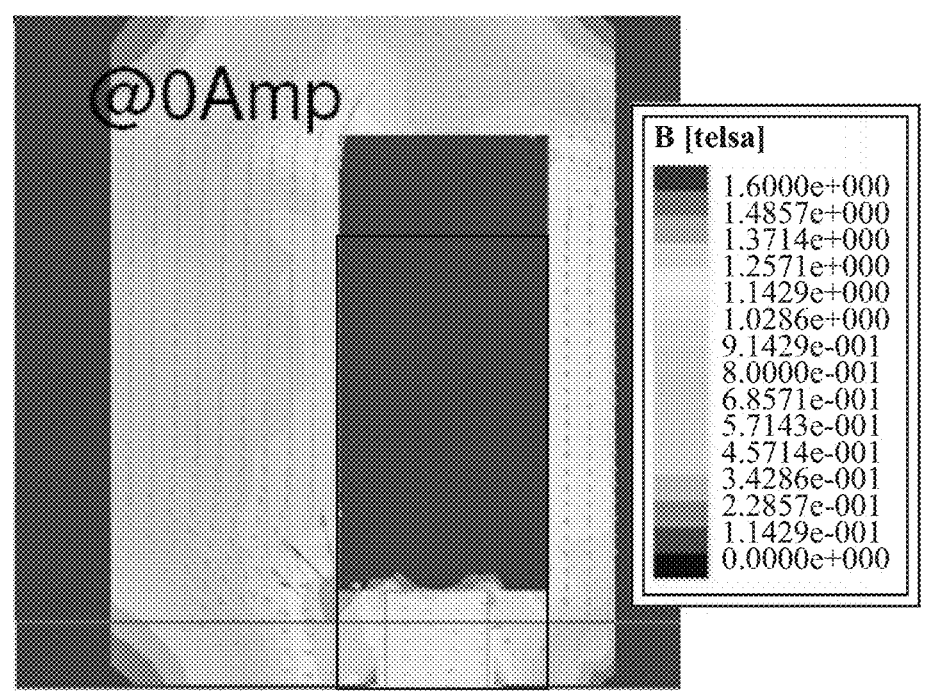
Figure 8B:
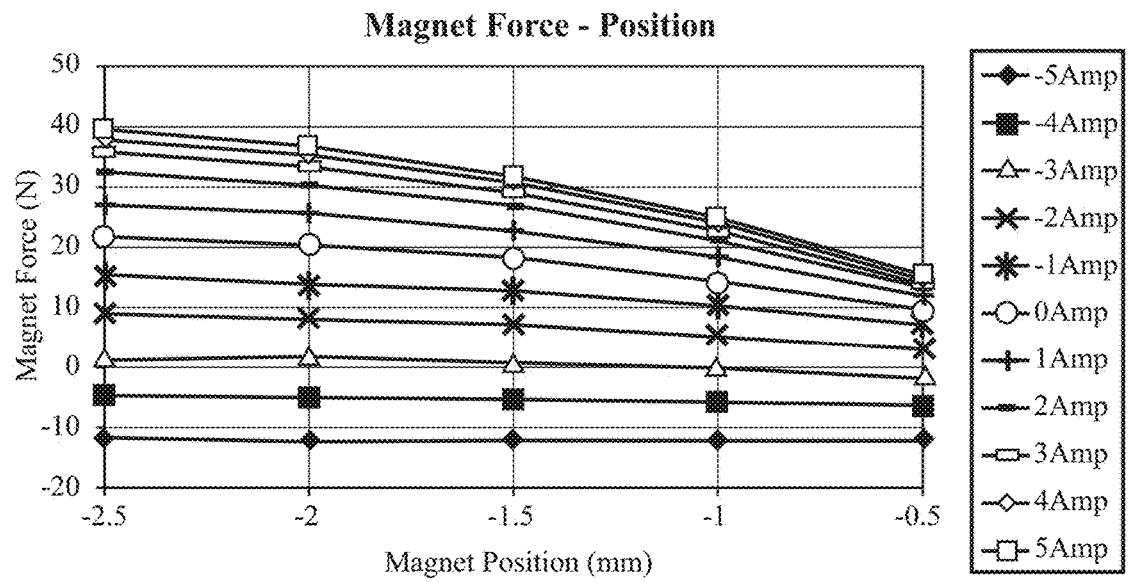
Figure 8C:
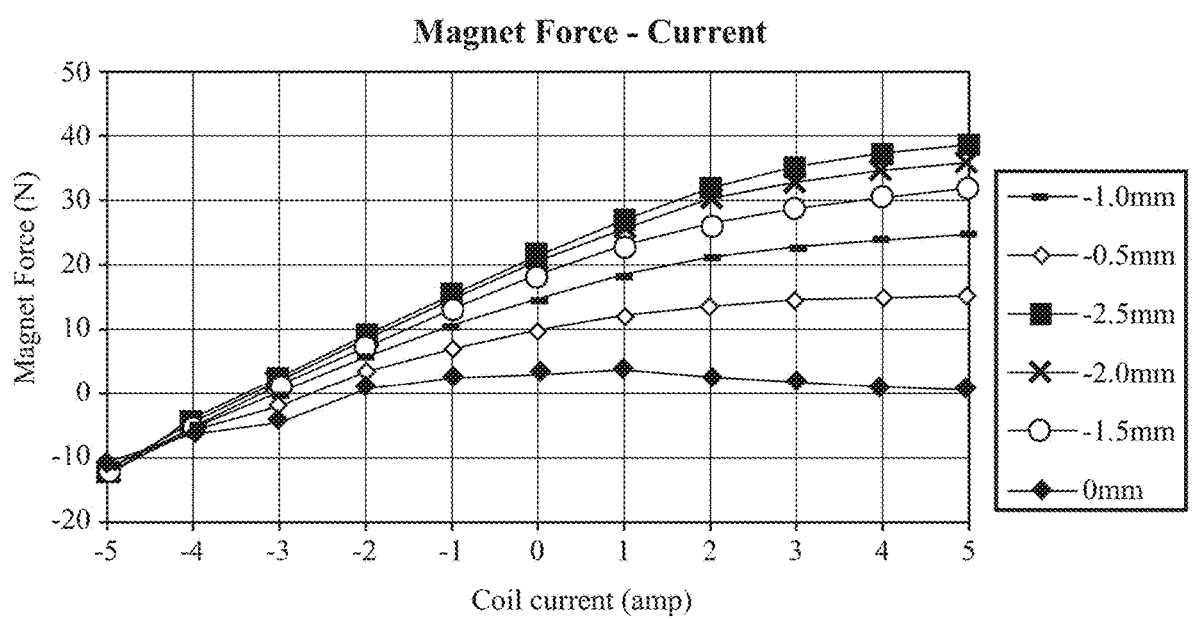

In another embodiment, illustrated in FIG. 3D, the magnetically actuated element 72 includes a plurality of block magnets 72c. The block magnets 72c are arranged on the diaphragm 62 in a correspondingly annular shape of the gap 82 between the sleeve 78 and the core 80. Much like the preceding embodiment, the block magnets 72c constantly provides a magnetic field. Because this magnetic field is always present, the fixed magnetic source 70 of this embodiment is a fixed induction coil 70b so that there are not always two interacting magnetic fields. Accordingly, as the fixed induction coil 70b is charged, the fixed induction coil 70b creates a magnetic field and pulls the block magnets 72c into the gap 82 or pushes them away from the gap 82. A graphical representation in FIG. 8A illustrates the rerouting of the magnetic field by the magnetic guide 76 when block magnets 72c are utilized, and includes a legend indicating the strength of the magnetic field along areas of the magnetic guide 76 and gap 78. FIGS. 8B and 8C are graphical representations of the block magnets' 72c position, which is dependent on the strength of the magnetic field as a function of amount of current provided to the fixed induction coil 72b.

The damping unit 20 in a preferred embodiment includes magnetorheological fluid (MR fluid). Barriers 30 of damping units 20 utilizing MR fluid typically define flow paths 102 extending between the top sub-chamber 34 and the base sub-chamber 32. As one of the sub-chambers 32, 34 are subjected to added pressure due to vibrational forces, the MR fluid is squeezed from the pressurized sub-chamber to the less-pressurized sub-chamber. In order to tune the amount of pressure that transfers MR fluid between sub-chambers 32, 34, and the rate in which the MR fluid flows, solenoids 104 are disposed adjacent to the flow paths 102. When the solenoids 104 are provided with a current, a magnetic field is created that extends around the flow paths 102. When MR fluid is exposed to a magnetic field, magnetic particles in the MR fluid align increasing viscosity and thereby becoming more resistant to squeezing through the flow path 102. In this manner, certain rebound characteristics of the MR damper can change with the amount of current supplied through the solenoid 104.

In addition to guiding the magnetic field of the fixed magnetic source 70, the magnetic sleeve 78 and core 80 also prevent flow path interference by rerouting and localizing the magnetic field away from the flow paths 102. In accordance with this functionality, the magnetic field created by the solenoid 104 is the only magnetic field that interacts with the MR fluid. Stated another way, the pushing and pulling of the decoupler 50 does not affect the viscosity around the flow paths 102 and the solenoid 104 does not affect the pushing and pulling of the decoupler 50.

In operation, the source of electrical current 94 could provide current to either end of the wrapped fixed induction coil 70b or moving coil 72a. As a result, the poles of the magnetic field created could be reversed, thus pushing instead of pulling. Furthermore, the current could be scaled based on necessity. On one end of the scale, no current would be provided, and thus the diaphragm 62 would flex unencumbered. On the other end of the scale, maximum current would be provided to the fixed induction coil 70b, the movable coil, or both. When maximum current is provided, a strong magnetic field is generated and the rib 92 of the diaphragm 62 is pulled completely into the gap 82 and the diaphragm 62 is restrained from vibration, i.e., dampening. In the middle of the scale, a medium amount of current can be provided which restricts some movement of the rib 92 relative to the gap 82, but still allows the diaphragm 62 to retain a certain amount of flexibility. The source of electrical current 94 can be electrically connected to a controller, such as a CPU 106 that would include programming to recognize a threshold frequency or amplitude of vibrations and provide enough current to have optimal damping from the decoupler 50. The CPU 106 recognized threshold could also be the rate of pressure change in one or more of the sub-chambers 32, 34. The CPU 106 could then signal the source of electrical current 94 to provide a certain amount of current in a certain direction in the fixed induction coil 70b of the moving coil 72a, ultimately providing a smoother ride to both a driver and passengers.

It should be appreciated that in the multiple embodiments described herein that the partition 36 is integrated into the barrier 30 and extends along the axis A. However, the partition 36 can be offset from the axis A and define an isolation chamber 48 anywhere within the damping unit 20. The isolation chamber 48 may be open to the atmosphere or completely closed off. Likewise, the vibrational forces do not need to be along the axis A, ultimately the decoupler 50 responds to the changing pressure of any chamber it divides. Additionally, it should be appreciated that the magnetic guide 76 and non-magnetic insert 90 could comprise any number of suitable materials. For example, these elements could comprise materials with high magnetic permeability that reroute the magnetic field, specifically, the magnetic flux. As just a few non-limiting examples, these materials could include cobalt-iron, permalloy, and many other suitable materials that ideally combine high magnetic permeability with low weight.

Obviously, many modifications and variations of the present invention are possible in light of the above teachings and may be practiced otherwise than as specifically described while within the scope of the appended claims. Antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A magnetically dynamic damping assembly comprising;
   a damping unit including a housing wall extending between a base portion and a top portion bounding a main chamber therein,
   a partition including a diaphragm of elastic material disposed in said damping unit impermeably dividing said main chamber into sub-chambers,
   said diaphragm including at least one magnetically actuated element,
   said partition further including a fixed magnetic source for creating a magnetic field adjacent to said at least one magnetically actuated element,
   a source of electrical current including an energized condition wherein said source of electrical current provides current to said partition creating a magnetic field regulating said at least one magnetically actuated element of said diaphragm relative to said fixed magnetic source and a non-energized condition wherein said source of electric current does not provide current and said diaphragm is unrestricted to flex as a result of pressure changing in one of said sub-chambers,
   said partition includes a magnetic guide surrounding said fixed magnetic source defining a gap exposing said fixed magnetic source to said magnetically actuated element and guiding said magnetic field towards said gap,
   said damping unit contains magnetorheological fluid and includes flow paths and a solenoid adjacent to said flow paths changing the viscosity of said magnetorheological fluid entering said flow paths.

2. An assembly as set forth in claim 1 wherein said magnetically actuated element extends axially from said diaphragm to define a surface rib extending towards said gap and wherein said surface rib is contoured to enter said gap in said energized condition.

3. An assembly as set forth in claim 2 wherein said diaphragm further includes a non-magnetic insert disposed therein and spaced under said at least one magnetically actuated element to provide radial and axial support and align said surface rib with said gap.

4. An assembly as set forth in claim 2 wherein said non-magnetic insert includes a stepped surface with a thinner portion spaced inwardly and a wider portion spaced outwardly and wherein said at least one magnetically actuated element is disposed on said thinner portion and said wider portion reroutes at least some lateral and axial outward magnetic interference from said gap back into said gap.

5. An assembly as set forth in claim 1 wherein said fixed magnetic source includes a fixed induction coil and said source of electrical current is electrically connected thereto for providing current and creating said magnetic field.

6. An assembly as set forth in claim 5 wherein said at least one magnetically actuated element includes a moving magnet.

7. An assembly as set forth in claim 5 wherein said at least one magnetically actuated element includes a moving coil and said source of electrical current is also electrically connected thereto for providing current independently to said moving coil and said induction coil to create interacting magnetic fields.

8. An assembly as set forth in claim 1 wherein said fixed magnetic source includes a fixed permanent magnet creating said magnetic field and said at least one magnetically actuated element includes a moving coil electrically connected to said source of electrical current actuating said moving coil to interact with said magnetic field created by said fixed permanent magnet.

9. A magnetically dynamic damping assembly comprising;
   a damping unit including a wall extending between a base portion and a top portion bounding a main chamber therein,
   a decoupler including a diaphragm of elastic material impermeably dividing said main chamber into sub-chambers,
   said diaphragm including at least one magnetically actuated element that extends axially therefrom to define a surface rib,
   a fixed magnetic source for creating a magnetic field to draw and repel said at least on magnetically actuated element,
   a magnetic guide surrounding said fixed magnetic source and defining a gap exposing said fixed magnetic source to said at least one magnetically actuated element wherein said magnetic guide contains and reroutes said magnetic field towards said gap,
   said magnetic guide includes a sleeve and a core pressed together,
   said sleeve includes an annular sleeve wall extending to a sleeve lip that extends radially inwardly therefrom and said core includes an annular core wall extending to a core lip extending radially outwardly therefrom.

10. An assembly as set forth in claim 9 wherein said at least one magnetically actuated element defines an annular shape and said gap is outlined by a corresponding annular shape for allowing entry of said at least one magnetically actuated element.

11. An assembly as set forth in claim 10 wherein said diaphragm further includes a non-magnetic insert having an annular shape disposed therein and spaced under said at least one magnetically actuated element to provide radial and axial support and align said magnetically actuated element with said gap.

12. An assembly as set forth in claim 10 wherein said at least one magnetically actuated element extends axially from said diaphragm towards said gap to define a surface rib on said diaphragm.

13. An assembly as set forth in claim 9 wherein said decoupler includes an outer ring portion being more rigid than and delimiting said diaphragm providing axial and radial support to said diaphragm.

14. An assembly as set forth in claim 13 wherein said damping unit includes a top bearing ring and a bottom bearing ring and wherein said outer ring of said decoupler is sandwiched between said top bearing ring and said bottom bearing ring.

15. An assembly as set forth in claim 14 wherein said outer ring has a cross section defining a circular outer portion and a medial neck portion and an inner holding portion and wherein said bearing rings each include bearing ribs extending on opposite sides towards said neck portion of said outer ring for allowing some axial flexing of said neck portion while retaining said circular outer portion.

16. An assembly as set forth in claim 9 wherein said damping unit contains magnetorheological fluid and includes flow paths and a solenoid adjacent to said flow paths for changing the viscosity of said magnetorheological fluid entering said flow paths.

17. A magnetically dynamic damping assembly comprising;
   a damping unit including a housing wall extending between a base portion and a top portion bounding a main chamber therein,
   a partition including a diaphragm of elastic material disposed in said damping unit impermeably dividing said main chamber into sub-chambers,
   said diaphragm including at least one magnetically actuated element, said partition further including a fixed magnetic source for creating a magnetic field adjacent to said at least one magnetically actuated element,
   a source of electrical current including an energized condition wherein said source of electrical current provides current to said partition creating a magnetic field regulating said at least one magnetically actuated element of said diaphragm relative to said fixed magnetic source and a non-energized condition wherein said source of electric current does not provide current and said diaphragm is unrestricted to flex as a result of pressure changing in one of said sub-chambers,
   said fixed magnetic source includes a fixed induction coil and said source of electrical current is electrically connected thereto for providing current and creating said magnetic field,
   wherein said at least one magnetically actuated element includes a moving magnet.

18. A magnetically dynamic damping assembly comprising;
   a damping unit including a housing wall extending between a base portion and a top portion bounding a main chamber therein,
   a partition including a diaphragm of elastic material disposed in said damping unit impermeably dividing said main chamber into sub-chambers,
   said diaphragm including at least one magnetically actuated element, said partition further including a fixed magnetic source for creating a magnetic field adjacent to said at least one magnetically actuated element,
   a source of electrical current including an energized condition wherein said source of electrical current provides current to said partition creating a magnetic field regulating said at least one magnetically actuated element of said diaphragm relative to said fixed magnetic source and a non-energized condition wherein said source of electric current does not provide current and said diaphragm is unrestricted to flex as a result of pressure changing in one of said sub-chambers,
   said fixed magnetic source includes a fixed induction coil and said source of electrical current is electrically connected thereto for providing current and creating said magnetic field,
   wherein said at least one magnetically actuated element includes a moving coil and said source of electrical current is also electrically connected thereto for providing current independently to said moving coil and said induction coil to create interacting magnetic fields.

* * * * *